No. 785,880. PATENTED MAR. 28, 1905.
C. E. HILL.
GRIDDLE.
APPLICATION FILED OCT. 11, 1904.
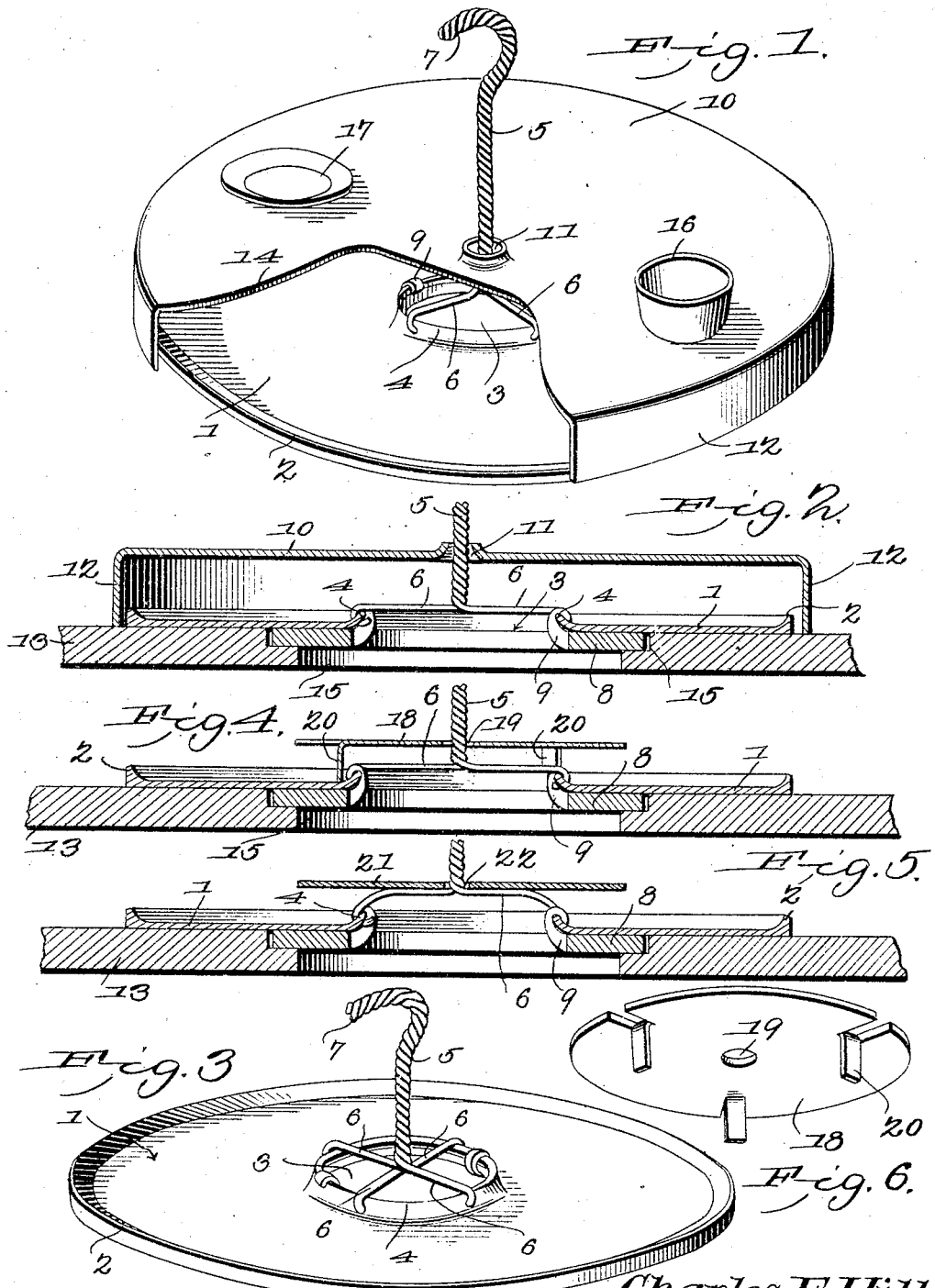
Witnesses
E. F. Stewart
H. S. Shepard
Charles E. Hill,
Inventor.
by C. A. Snow & Co.
Attorneys No. 785,880.

Patented March 28, 1905.

UNITED STATES PATENT OFFICE.

CHARLES E. HILL, OF MILLINGTON, MICHIGAN.

GRIDDLE.

SPECIFICATION forming part of Letters Patent No. 785,880, dated March 28, 1905.

Application filed October 11, 1904. Serial No. 228,074.

*To all whom it may concern:*

Be it known that I, CHARLES E. HILL, a citizen of the United States, residing at Millington, in the county of Tuscola and State of Michigan, have invented a new and useful Griddle, of which the following is a specification.

This invention relates to cooking utensils, particularly griddles, and is designed to prevent the arising of smoke and odors from the griddle and in this connection to direct the smoke and odors into the fire-box of the stove, there to be consumed.

Another object of the invention is to maintain the griddle covered and at the same time to give access to a portion thereof for applying batter thereto, turning partially-cooked cakes, and for finally removing the cooked cakes.

It is furthermore designed to effect convenient rotation of the griddle, so as to bring unused portions thereof into position for the application of batter, to bring partially-cooked cakes into position for turning, and to permit the successive removal of the cooked cakes.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the accompanying drawings, Figure 1 is a perspective view of a griddle embodying the features of the present invention. Fig. 2 is a longitudinal sectional view thereof in connection with a portion of a stove-top. Fig. 3 is a perspective view of the griddle member alone. Figs. 4 and 5 are views similar to Fig. 2, showing modified forms of covers. Fig. 6 is a detail perspective view of the form of cover illustrated in Fig. 4.

Like characters of reference designate corresponding parts in each and every figure of the drawings.

The present griddle 1 is of suitable material and preferably circular in form to facilitate turning thereof for a purpose as will be hereinafter described. The outer edge of the griddle is provided with an upstanding peripheral rim 2, and at the center of the griddle there is an opening 3, surrounded by an upstanding rim or flange 4, the opening 3 being designed to be placed over a stove-hole in order that smoke and odors may pass therethrough into the stove.

For convenience in handling the griddle there is provided a handle consisting of a shank or stem 5, which is provided in its lower end with a spider or radially-disposed leg members 6, which are connected to the inner rim 4, so as to support the stem above the opening 3, the upper end of the stem being formed into a hook-shaped handle 7. The handle may be conveniently formed of a plurality of wires, according to the number of legs 6, said wires being twisted together to form the shank or stem and the handle 7.

The central portion of the griddle is reinforced by a heavy metallic ring 8, applied to the under side of the griddle and surrounding the central opening 3. While this ring may be riveted or otherwise secured to the griddle, a convenient connection therewith may be obtained by means of ears or projections 9 upon the inner periphery of the ring, which are bent over and clenched upon the inner upstanding rim 4 of the griddle.

The body of the griddle is inclosed within an inverted substantially cylindrical cover consisting of a flat top 10, having a central opening 11 for the reception of the handle and provided with a pendent peripheral flange or rim 12, which is of a diameter slightly greater than that of the griddle, so as to rest upon the top of the stove 13 when in use, and thereby provide for the necessary space between the griddle and the top of the cover to accommodate the cakes or other articles when cooking. An edge opening 14 is formed in the cover and its rim and is of a size to give convenient access to the top of the griddle.

In using the form of the device as thus far described the griddle is placed upon a stove by means of its handle, the reinforcing-ring 8 being fitted within the stove-hole 15, and thereby operates to prevent burning and consequent wear upon the center of the griddle, which is exposed to the fiercest heat. A bowl 16 of batter is placed upon the top of the cover, and a plate 17 is placed upon the cover opposite the bowl. The griddle is then greased by placing the greasing member upon that portion of the griddle which is exposed through the opening 14 of the cover, the griddle being rotated by manipulation of the handle 7 so as to grease the entire top of the griddle. Batter is then applied to the exposed portion of the griddle, and the latter is intermittently rotated to expose new portions of the griddle for the reception of batter until the griddle has been entirely filled, when the original cake will be exposed through the opening in the cover and may then be turned, the griddle being intermittently turned by its handle until all of the cakes have been turned or inverted, whereupon the original cake will have been entirely cooked and in position to be removed from the griddle through the opening 14 and placed upon the plate 17, the remaining cakes being successively removed in the same manner. During the cooking of the cakes there will be a current of air passing in through the opening 14 over the top of the griddle and thence downwardly through the opening 3 into the fire-box of the stove, whereby smoke and odors will be carried into the stove and consumed, thus effectually preventing the odors and smoke from arising, and thereby obviating a very serious objection to ordinary griddles. It will here be noted that the cover affords a convenient support for the bowl of batter and the dish for containing the cooked cakes, whereby the cakes will be maintained in a heated condition, which is an important consideration. It will of course be understood that the cover is supported entirely upon a stove, and the griddle fits with sufficient looseness within the cover to rotate therein without rotating the latter.

While the cover 10 serves to retain heat therein, it is not essential that the griddle be entirely covered to produce a current of air across the top thereof and downwardly through the central opening to carry smoke and the like into the stove, as will be understood by reference to Fig. 4 of the drawings, wherein a small cover in the nature of a plate 18 is employed and is provided with a central opening 19 for the reception of the shank of the handle and has a plurality of legs or supports 20, preferably cleft from the plate and bent downwardly, so as to rest upon the top of the griddle and space the plate above the opening 3, thereby to cause a draft or current of air across the top of the griddle and downwardly through the opening 3. In this form of the device the handle serves for placing the griddle upon the stove and for removing it therefrom, and while the griddle may be rotated by the handle to give convenient access to all parts of the griddle it is of course not necessary, for the reason that the small cover 18 does not obstruct the upper face of the griddle.

Instead of supporting the small cover upon legs the legs may be dispensed with, as in Fig. 5, wherein the cover 21 is a flat plate without any projections whatsoever and provided with a central opening 22 for the reception of the shank or stem of the handle, said cover being supported upon the leg members 6 of the handle, whereby the cover is spaced a suitable distance above the opening 3 to produce the desired draft or current of air.

The present griddle may of course be used without a cover in the manner of an ordinary griddle, and by reason of the central opening 3 smoke and odors will to a certain extent be carried downwardly through the opening 3 into the fire-box of the stove which renders the present device more advantageous than an ordinary griddle. By employing either of the comparatively small covers 18 and 21 a more effective carrying off of smoke and odors will be obtained, and by the employment of the large cover or hood 10 the most effective carrying off of smoke and odors will be obtained together with a quicker cooking of the cakes for the reason that the cover retains the heat.

Having fully described the invention, what is claimed is—

1. A cooking utensil of the class described having an opening and a reinforcement upon its under side around the opening to take wear and to fit within a stove-hole.

2. A cooking utensil of the character described having an opening in the bottom thereof and a reinforcing-ring applied to the under side of the utensil around the opening therein to take wear and to fit within a stove-hole.

3. A cooking utensil of the character described having an opening in the bottom thereof surrounded by an upstanding rim, and a reinforcing-ring applied to the under side of the utensil around the opening therein and provided upon its inner periphery with projections which rise through the opening in the utensil and are connected to the rim thereof.

4. A cooking utensil of the character described having a central opening in the bottom thereof, and an upstanding handle formed of twisted strands which are spread at their lower ends and connected to the bottom of the utensil with the handle located centrally above the opening.

5. A cooking utensil of the character described having a central opening in the bottom thereof, a handle rising centrally above the opening and provided with legs arching across the opening and connected to the bottom of the utensil, and a cover supported centrally over the opening and pierced by the handle to form a deflector for directing currents of air to and downwardly through the opening.

6. A cooking utensil of the character described comprising a base having a central opening, a reinforcing-ring applied to the under side of the base around the opening therein to take wear and to fit within a stove-hole, and a handle rising centrally above the opening and formed of twisted strands which are spread at their lower ends to form legs arched across the opening and connected to the base.

7. A cooking utensil of the character described comprising a base, a cover having a pendent peripheral rim of greater diameter than the base for engagement with the top of the stove to support the cover independently of the base, said cover having an opening to expose a portion of the base, and a handle carried by the base and passing through the cover, the base being rotatable independently of the cover by manipulation of the handle.

8. A cooking utensil of the character described comprising a substantially circular base having a central opening, a cover having a pendent peripheral rim of greater diameter than the base for engagement with the top of a stove to support the cover independently of the base, said cover being provided with an opening exposing a portion of the base, and a handle rising centrally from the base and through the cover, the base being rotatable within the cover by manipulation of the handle.

In testimony that I claim the foregoing as my own I have hereto affixed my signature in the presence of two witnesses.

CHARLES E. HILL.

Witnesses:
R. G. LYON,
HARRY J. P. GEORGE.